(12) United States Patent
Rockenfeller et al.

(10) Patent No.: US 8,299,646 B2
(45) Date of Patent: *Oct. 30, 2012

(54) HVAC/R SYSTEM WITH VARIABLE FREQUENCY DRIVE (VFD) POWER SUPPLY FOR MULTIPLE MOTORS

(75) Inventors: Uwe Rockenfeller, Boulder City, NV (US); Paul Sarkisian, Boulder City, NV (US); Kaveh Khalili, Boulder City, NV (US); Warren Harhay, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 508 days.

This patent is subject to a terminal disclaimer.

(21) Appl. No.: 12/510,142

(22) Filed: Jul. 27, 2009

(65) Prior Publication Data

US 2011/0018472 A1    Jan. 27, 2011

(51) Int. Cl.
*H02J 1/00* (2006.01)

(52) U.S. Cl. ............. 307/30; 318/12; 318/67; 318/110; 318/801; 62/228.4; 165/58; 307/18; 307/27; 307/73; 363/65

(58) Field of Classification Search .............. 363/65; 307/27, 30, 73
See application file for complete search history.

(56) References Cited

U.S. PATENT DOCUMENTS

| | | | |
|---|---|---|---|
| 3,424,916 A | 1/1969 | Fenley | |
| 3,798,519 A * | 3/1974 | Habisohn | 318/46 |
| 3,877,243 A * | 4/1975 | Kramer | 62/180 |
| 4,006,603 A | 2/1977 | Miles | |
| 4,340,823 A | 7/1982 | Miyazawa | |
| 4,665,707 A | 5/1987 | Hamilton | |
| 4,694,236 A | 9/1987 | Upadhyay et al. | |
| 5,142,468 A * | 8/1992 | Nerem | 363/71 |
| 5,675,982 A | 10/1997 | Kirol et al. | |
| 5,712,540 A * | 1/1998 | Toda et al. | 318/46 |
| 5,718,125 A | 2/1998 | Pfister et al. | |
| 5,874,788 A | 2/1999 | McCartney | |
| 5,927,598 A | 7/1999 | Broe | |
| 5,929,538 A | 7/1999 | O'Sullivan et al. | |
| 5,977,659 A | 11/1999 | Takehara et al. | |
| 6,005,362 A | 12/1999 | Enjeti et al. | |
| 6,094,034 A | 7/2000 | Matsuura | |
| 6,188,591 B1 * | 2/2001 | Ruter et al. | 363/65 |

(Continued)

FOREIGN PATENT DOCUMENTS

EP        901218        3/1999

(Continued)

OTHER PUBLICATIONS

Buchholz, Energy efficiency improvements in commercial cooling applications, Sanken Technical Report, 2002, vol. 34, Issue 1, pp. 47-50.

(Continued)

*Primary Examiner* — Rexford Barnie
*Assistant Examiner* — Justen Fauth
(74) *Attorney, Agent, or Firm* — Knobbe Martens Olson & Bear, LLP

(57) ABSTRACT

An HVAC/R system is configured with a variable frequency drive power supply which provides power to each of a compressor, a condenser fan, and a blower. In some embodiments, the compressor has a three-phase motor and the condenser fan has a single-phase motor.

9 Claims, 5 Drawing Sheets

U.S. PATENT DOCUMENTS

| | | | |
|---|---|---|---|
| 6,242,883 | B1 | 6/2001 | Strunk |
| 6,257,007 | B1 | 7/2001 | Hartman |
| 6,304,006 | B1 | 10/2001 | Jungreis |
| 6,316,895 | B1 | 11/2001 | Ramarathnam |
| 6,471,013 | B2 | 10/2002 | Banno et al. |
| 6,639,373 | B2 | 10/2003 | Knight et al. |
| 6,843,064 | B2 | 1/2005 | Khalili et al. |
| 6,847,130 | B1 | 1/2005 | Belehradek et al. |
| 7,151,328 | B2 | 12/2006 | Bolz et al. |
| 7,332,885 | B2 | 2/2008 | Schnetzka et al. |
| 2002/0180400 | A1* | 12/2002 | George et al. ........... 318/727 |
| 2003/0048006 | A1 | 3/2003 | Shelter, Jr. et al. |
| 2003/0155875 | A1* | 8/2003 | Weinmann ........... 318/110 |
| 2004/0046458 | A1 | 3/2004 | MacKay |
| 2004/0095091 | A1 | 5/2004 | McNulty et al. |
| 2004/0245949 | A1 | 12/2004 | Ueda et al. |
| 2005/0006958 | A1 | 1/2005 | Dubovsky |
| 2005/0189888 | A1* | 9/2005 | Federman et al. ........... 318/67 |
| 2005/0223730 | A1* | 10/2005 | Kester et al. ........... 62/259.2 |
| 2006/0061321 | A1* | 3/2006 | Han et al. ........... 318/801 |
| 2006/0103342 | A1 | 5/2006 | Mechi |
| 2006/0208687 | A1 | 9/2006 | Takeoka et al. |
| 2006/0250107 | A1* | 11/2006 | Jadric et al. ........... 318/812 |
| 2007/0114962 | A1 | 5/2007 | Grbovic |
| 2008/0008604 | A1* | 1/2008 | Tolbert ........... 417/364 |

FOREIGN PATENT DOCUMENTS

| | | |
|---|---|---|
| EP | 1057236 | 4/2004 |
| GB | 1287648 | 9/1972 |
| GB | 2354378 | 3/2001 |
| JP | 43-64372 | 12/1992 |
| JP | 51-57330 | 6/1993 |
| JP | 52-76690 | 10/1993 |
| JP | 53-24106 | 12/1993 |
| JP | 06327294 * | 11/1994 |
| JP | 72-39672 | 9/1995 |
| JP | 91-68299 | 6/1997 |
| JP | 2005-210869 | 8/2005 |
| JP | 2008-048568 | 2/2008 |
| WO | WO 98/02695 | 1/1998 |
| WO | WO 2005/020407 | 3/2005 |

OTHER PUBLICATIONS

Holtz et al., A high-power multitransistor-inverter uninterruptable power supply system, IEEE Transactions on Power Electronics, Jul. 1988, vol. 3, Issue 3, pp. 278-285.

Mallinson, "Plug and play" single chip controllers for variable speed induction motor drives in white goods and HVAC systems, Thirteenth Annual Applied Power Electronics Conference and Exposition, Feb. 19, 1998, vol. 2, pp. 756-762.

Manz, Applying adjustable speed drives (ASDs) to 3 phase induction NEMA frame motors, Proceedings of 38th Cement Industry Technical Conference, Apr. 14, 1996, pp. 71-78.

Matsui et al., Improvement of transient response of thermal power plant using VVVF inverter, International Conference on Power Electronics and Drive Systems, Nov. 27, 2007, pp. 1209-1214.

Meenakshi et al., Intelligent controller for a stand-alone hybrid generation system, 2006 IEEE Power India Conference, Apr. 10, 2006, pp. 8.

Muntean et al., Variable speed drive structures and benefits in cooling tower fans applications, Dept. of Electr. Eng., Univ. Politehnica of Timisoara, Romania WSEAS Transactions on Systems, Apr. 2007, vol. 6, Issue 4, pp. 766-771.

Nelson et al., Basics and advances in battery systems, IEEE Transactions on Industry Applications, Mar. 1995, vol. 31, Issue 2, pp. 419-428.

Prest et al., Development of a three-phase variable speed drive system for a battery fed underground mining locomotive, Third International Conference on Power Electronics and Variable-Speed Drives, Jul. 13, 1988, pp. 233-236.

Stefanovic, Adjustable speed drives: Applications and R&D needs; Department of Energy, Washington, DC. Report No. ORNL/SUB-80-SN772, Sep. 1995.

Sukumara et al., Fuel cell based uninterrupted power sources, International COnference on Power Electronics and Drive Systems, May 26, 1997, vol. 2, pp. 728-733.

Suryawanshi et al., High power factor operation of a three-phase rectifier for an adjustable-speed drive, IEEE Transactions on Industrial Electronics, Apr. 2008, vol. 55, Issue 4, pp. 1637-1646.

Thoegersen et al., Adjustable Speed Drives in the Next Decade: Future Steps in Industry and Academia, Electric Power Components and Systems, 2004, vol. 32, Issue 1, pp. 13-31.

Tolbert et al., A bi-directional DC-DC converter with minimum energy storage elements, Conference Record of the Industry Applications Conference, 2002., Oct. 13, 2002, vol. 3, pp. 1572-1577.

Tracy et al., Achieving high efficiency in a double conversion transformerless UPS, IECON 2005, Nov. 6, 2005, pp. 4.

Welchko et al., A novel variable frequency three-phase induction motor drive system using only three controlled switches, Thirty-Fifth IAS Annual Meeting and World Conference on Industrial Applications of Electrical Energy, Oct. 8, 2000, vol. 3, pp. 1468-1473.

Yang Kuan-Hsiung et al., An improved assessment model of variable frequency-driven direct expansion air-conditioning system in commercial buildings for Taiwan green building rating system, Taiwan Building and environment, 2007, vol. 42, Issue 10, pp. 3582-3588.

Yuan et al., Integrated uninterruptible DC converter with low input distortion and wide regulation capability, Fifth International Conference on Power Electronics and Variable-Speed Drives, Oct. 26, 1994, pp. 638-644.

Yuedong Zhan et al., Development of a single-phase high frequency UPS with backup PEM fuel cell and battery, International Conference on Electrical Machines and Systems, Oct. 8, 2007, pp. 1840-1844.

* cited by examiner

HVAC/R SYSTEM WITH VARIABLE FREQUENCY DRIVE (VFD) POWER SUPPLY FOR MULTIPLE MOTORS

BACKGROUND

In existing heating, ventilation, air conditioning, and refrigeration (HVAC/R) systems, variable speed drives, commonly referred to as variable frequency drives (VFD), are used to more efficiently operate and provide power to the HVAC/R components. HVAC/R systems typically include a three-phase compressor motor and a single-phase condenser fan motor which operate together, at the same time. It is, therefore, desirable that the three-phase compressor motor and a single-phase condenser motor are powered from the same power supply. However, single-phase condenser motors are considered incompatible with the power output from a VFD. Consequently, it is the present practice to not use a VFD for the compressor and the condenser fan. HVAC/R systems typically also include a single-phase or three-phase blower motor. Because the blower is operated independently of the compressor and the condenser fan, it is present practice to power the blower motor with a separate power supply. These practices, although common, increase the cost of the HVAC/R system.

SUMMARY OF THE INVENTION

Described herein is a method of transitioning power states for an HVAC/R system, the method including supplying power to a single variable frequency drive inverter (VFD) configured to supply power to a plurality of components, each of the components configured to be either on or off, supplying power from the VFD to the on components, generating an indication that at least one of one or more of the on components are to be transitioned from on to off, and one or more of the off components are to be transitioned from off to on, where one or more of the components is to be on after the one or more transitions. The method also includes in response to the indication, powering down the plurality of components, and subsequent to powering down the plurality of components, powering up the one or more components to be on.

In some embodiments, an HVAC/R system includes a compressor, a condenser fan, a blower, and a single variable frequency drive inverter power supply (VFD), configured to generate a three-phase output for the compressor, for the condenser fan, and for the blower.

In some embodiments, a method of configuring an HVAC/R system includes connecting a single variable frequency drive inverter (VFD) to a power source, the VFD configured to generate a power output having three phases, connecting a compressor to the power output, connecting a condenser fan to the power output, and connecting a blower to the power output.

In some embodiments, a method of configuring power for operating an HVAC/R system includes supplying power to a single variable frequency drive inverter (VFD), the VFD configured to generate a power output having three phases, supplying power from the power output of the VFD to a compressor, supplying power from the power output of the VFD to a condenser fan, and supplying power from the power output of the VFD to a blower.

DETAILED DESCRIPTION

Figure 4:
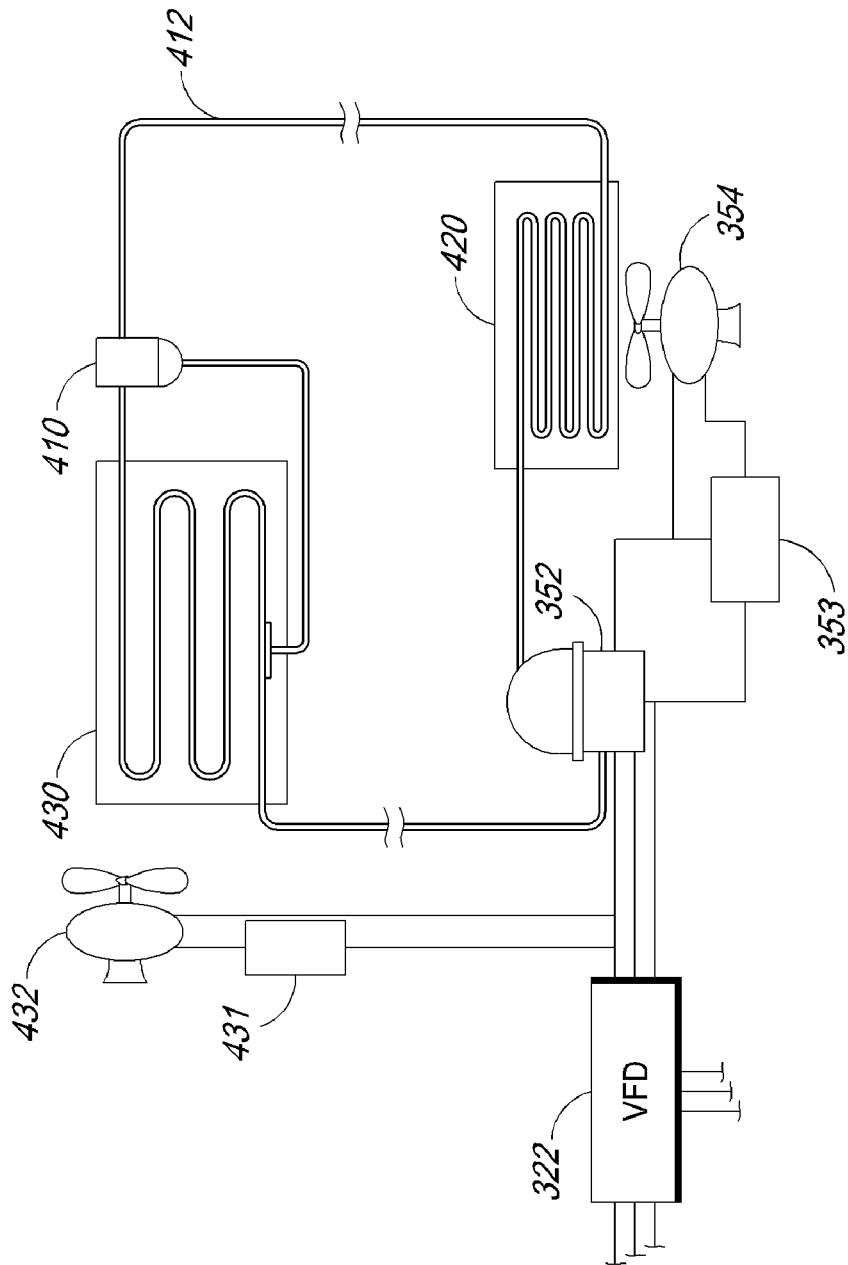
FIG. 4 is a schematic illustration of vapor compression cooling components of an HVAC/R system embodiment.

The power supply system for an existing HVAC/R system may be configured, such that, rather than receiving power directly from an AC utility source, the HVAC/R system components receive power from another power supply, such as a frequency drive power supply (VFD), which receives power from a DC bus. In the system, the AC utility source provides power to the DC power bus of the HVAC/R system through, for example, a rectifier. The DC power bus is used to provide power to one or more power supplies which generate appropriate AC power for the HVAC/R system components, such as the compressor motor, condenser fan, and the evaporator fan or blower. An embodiment with an evaporator fan 432 is shown in FIG. 4.

In some embodiments, an HVAC/R system includes a compressor motor and a condenser fan which operate at the same time. In addition, the system includes one or more other components, such as a blower fan. In order to reduce the total number of power supplies, multiple components are advantageously driven with the same power supply. In addition, at least because of power efficiency at start up of the compressor motor, a VFD is desirable. A VFD chops the DC voltage from the DC power bus into three outputs 120 degrees out of phase, which the motors driven see as AC.

Figure 1:
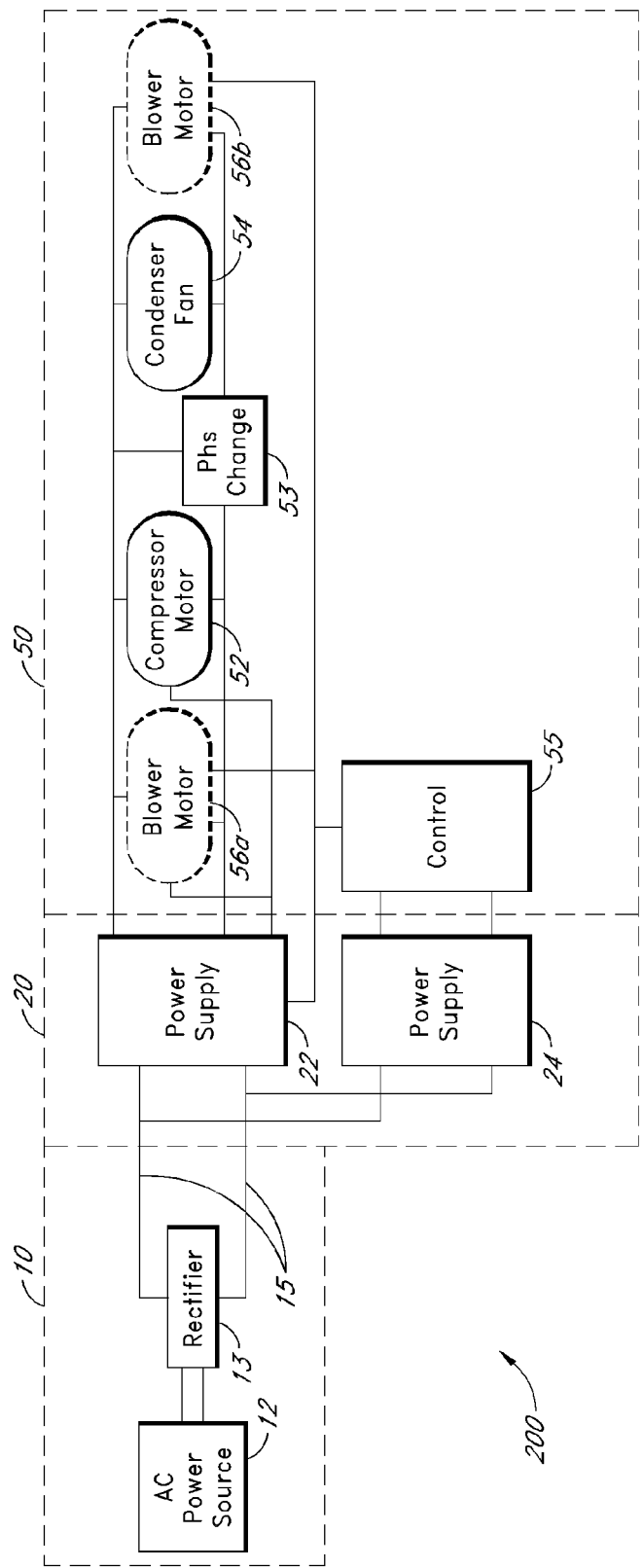
FIG. 1 is a schematic block diagram illustrating an HVAC/R system according to one embodiment.

FIG. 1 is a diagram of one embodiment of an HVAC/R system. The HVAC/R system 200 includes a power source section 10, a power supply section 20, and an HVAC/R component section 50. The power source section 10 includes power sources which provide power to the components of the HVAC/R system 200. The power supply section 20 includes power supplies which receive power from the power source section 10 and condition the power for use by the HVAC/R components of the HVAC/R component section 50. The HVAC/R components of the HVAC/R component section 50 perform HVAC/R functions of the HVAC/R system.

In the embodiment of FIG. 1, the power source section 10 includes a first power source 12, a rectifier 13, and a power bus 15. In this embodiment, the first power source 12 is an AC power source and provides power to the rectifier 13, which provides substantially DC power to the power bus 15. In alternative embodiments, the first power source 12 may be a DC power source, which provides DC power to the power bus 15. Accordingly, in such embodiments, the rectifier 13 is omitted. In some embodiments, a second power source (not shown) is also configured to provide power to the power bus 15.

Power source 12 may be any type of power source. In the embodiment of FIG. 1, power source 12 is an AC power source. Power source 12, for example, may be an AC mains, such as that provided by the local power company. Power source 12 may have, for example, one or three phases. In some embodiments, power source 12 is a three-phase, about 240V, AC source. Other power sources include a solar or wind powered generator.

Rectifier 13 is configured to receive AC power from the first power supply 13, to rectify the power signal to a substantially DC level, and to provide the DC level to the power bus 15 appropriate for the system.

An optional second power source (not shown) may be included. For example, a secondary or back-up power source, such as a battery or a battery pack, configured to be charged may be used. Other types of energy storage devices may also be used. The second power source is, for example, connected to the power bus 15, and is configured to be charged by the power bus 15 when the first power source 12 is functioning and the second power source is not fully charged. The second power source is further configured to provide power to the power bus 15 when the power from the rectifier 13 or the first power source 12 is insufficient for the load on the power bus 15.

The power supply section 20 includes one or more power supplies which receive power from the power source section 10 and condition the power for use by the HVAC/R components of the HVAC/R component section 50. In the embodiment of FIG. 1, there are two power supplies 22 and 24. In other embodiments, fewer or more power supplies are used. Each of the power supplies of the power supply section 20 are used to supply power to one or more of a plurality of components of the HVAC/R component section 50. In the embodiment shown, each of the power supplies 22 and 24 are connected to the power bus 15.

In this embodiment, power supply 22 is configured to supply power to compressor motor 52, the motor of condenser fan 54, and either or both of blower motors 56a and 56b. Power supply 24 is configured to supply power to control module 55. Although shown separately, rectifier 13 may be integrated with power supply 22.

In one embodiment, power supply 22 is a 10 hp variable frequency drive power supply (VFD). In some embodiments, the VFD comprises the power supply 22 and the rectifier 13. A VFD may be used because of increased power efficiency achieved through controlled start up of the inductive loads of the motors. When a constant frequency and voltage power supply, such as an AC mains power supply, is used, inrush current to start a motor may be six to ten times the running current. Because of system inertia, the compressor motor, for example, is not powerful enough to instantaneously drive the load at full speed in response to the high frequency and high speed signal of the power supply signal needed at full-speed operation. The result is that the motors go through a start-up phase where the motors slowly and inefficiently transition from a stopped state to full speed. During start up, some motors draw at least 300% of their rated current while producing less than 50% of their rated torque. As the load of the motors accelerate, the available torque drops and then rises to a peak while the current remains very high until the motors approach full speed. The high current wastes power and degrades the motors. As a result, overall efficiency, effectiveness, and lifetime of the motors are reduced.

When a VFD is used to start the motors, a low frequency, low voltage power signal is initially applied to the motors. The frequency may be about 2 Hz or less. Starting at such a low frequency allows the load to be driven within the capability of the motors, and avoids the high inrush currents that occur at start up with the constant frequency and voltage power supply. The VFD is used to increase the frequency and voltage with a programmable time profile which keeps the acceleration of the load within the capability of the motor. As a result, the load is accelerated without drawing excessive current. This starting method allows a motor to develop about 150% of its rated torque while drawing only 50% of its rated current. As a result, the VFD allows for reduced motor starting current from either the AC power source 12 or the DC power source 14, reducing operational costs, placing less mechanical stress on the motors, and increasing service life. The VFD also allows for programmable control of acceleration and deceleration of the load.

The VFD of power supply 22 is controlled by control module 55, and produces a three-phase output, which powers the compressor motor 52, and optional blower motor 56a, three-phase motors. The compressor motor 52 and blower motor 56a have rotational symmetry of rotating magnetic fields such that an armature is magnetized and torque is developed. By controlling the voltage and frequency of the three-phase power signal, the speed of the motors is controlled whereby the proper amount of energy enters the motor windings so as to operate the motors efficiently while meeting the demand of the accelerating load. Electrical motive is generated by switching electronic components to derive a voltage waveform which, when averaged by the inductance of the motors, becomes the sinusoidal current waveform for the motors to operate with the desired speed and torque. The controlled start up of compressor motor 52 and blower motor 56a described above allows for high power efficiency and long life of compressor motor 52 and blower motor 56a.

Use of a VFD to power the motors allows for speed control, removing the limitation on the system to be either fully on or off. For example, an HVAC/R system with a VFD can operate the compressor at a speed corresponding to the cooling requirements of the environment having its temperature controlled. For example, if the controlled environment generates 500 watts of power, the compressor can be operated at a speed that corresponds to the heat generated by the 500 watts. This allows for improved power efficiency in the system because power inefficiencies experienced with repeatedly starting and stopping the compressor is avoided.

Furthermore, in some controlled environments, such as well insulated spaces, the heat generated is relatively constant. Accordingly, the energy to be removed is relatively constant. For such environments, the compressor motor may be designed for operation according to the load corresponding to the relatively constant energy to be removed. Such limited range of load allows for the compressor to be efficiently operated.

Another benefit to speed control is that the range of temperatures in controlled environment is dramatically reduced when compared to conventional HVAC/R systems in which the compressor is either fully on or off. In conventional HVAC/R systems, in order to prevent frequent state changes between off and on, the control system works with a hysteresis characteristic. In such systems, temperature excursions correspond to the hysteresis. For example, in some systems the hysteresis of the system is 3 degrees. If the temperature is set to −5 C, once the temperature of the environment is −5 C, the compressor is turned off. However, because of the 3 degrees of hysteresis, the compressor will not be turned on again until the temperature of the environment is −2 C. In contrast, in an HVAC/R system with a VFD controlling the compressor, the active control system incrementally increases and decreases the speed of the compressor to provide precise control of the temperature in the environment. As a result, there is no hysteresis, and, accordingly, significantly reduced trade-off between consistency of temperature and power consumption.

In the embodiment shown, the three-phase output of power supply 22 powers the three-phase compressor motor 52 and blower motor 56a, and also powers the single-phase condenser fan 54 and the optional single-phase blower motor

56*b*. The result is beneficial system cost savings by eliminating a power supply dedicated to each of the various motors. In addition, the system has speed control and the range of the speed control is unlimited for the one or more 3-phase motors and is limited at the low end of the range for the one or more 1-phase motors. While the discussion herein is generally directed to a system having a condenser fan 54, a compressor motor 52, and either of optional blower motors 56*a* and 56*b*, it is to be understood that the discussion applies to systems having one or more additional three-phase motors and/or one or more additional single-phase motors driven by power supply 22.

Conventional electromechanical controls knowledge might suggest that when a VFD is used with a three-phase motor, any single-phase motors also driven by the VFD are discarded and replaced with three-phase motors compatible with the variable speed three-phase output of the power supply. In the system described and shown herein, because the condenser fan 54 and the blower motor 56*b* do not need to have three-phase motors, less expensive single-phase motors are used, and the three-phase power from power supply 22 is conditioned by phase change module 53.

As shown in FIG. 1, phase change module 53 is connected between the VFD power supply 22 and the single-phase motors of the condenser fan 54 and the blower motor 56*a*. Single-phase motors are not generally compatible with variable frequency and voltage operation. In single-phase motors, a "new" phase is generated to be used with the single phase of the input power signal to create rotating magnetism to the armature to generate torque. For example, if the single-phase motor is a shaded pole motor, a shading ring serves as an inductance capable of storing a magnetic field and generating the "new" phase. If the single-phase motor is a permanent split capacitor motor, a capacitor provides a phase lead of current to one terminal relative to another. The power efficiency of the shading ring and the capacitor, however, is frequency dependent, and therefore these elements are tuned to the running frequency of the motor according to its application. At non-specified frequencies, the behavior of the motor and that of the new phase generating elements are inefficient and the motor torque suffers. In addition, the power output signal of the VFD has large transient voltage spikes at high frequencies (e.g. 2-6 KHz). These transients can exceed the brake down voltage of the new phase generating elements, and cause high current spikes which increase heat and reduce power efficiency of the motor and its components. Therefore, these motors are ineffective for use in a variable frequency drive scheme.

Figure 2:
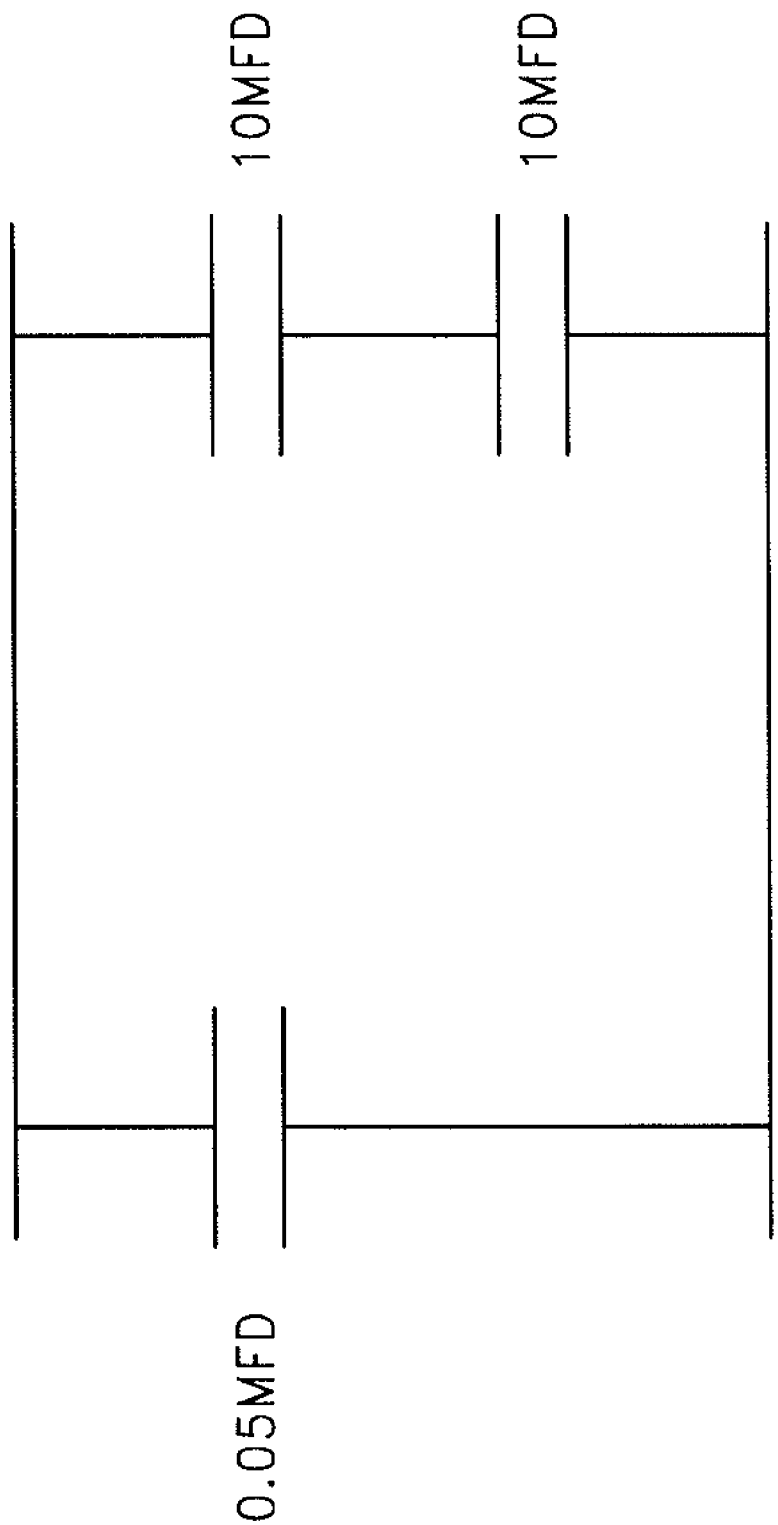
FIG. 2 is a schematic diagram illustrating a phase change module embodiment.

The preexisting single-phase motors of condenser fan 54 and blower motor 56*a* may be modified to operate efficiently in the variable frequency drive scheme of FIG. 1. The single-phase motor is similar to a three-phase motor where the first two poles carry the single phase of the power input, and the third pole receives the new phase generated by the inductive and capacitive elements. In HVAC/R system 200, the single-phase motors receive two of the three phases generated by the power supply 22. In addition, the modified single-phase motor has its new phase generation elements replaced with elements which are compatible with the large transient voltage spikes of the VFD, such as those shown in FIG. 2. In one embodiment of phase change circuit 53, the modification of the single-phase motor includes replacing the run capacitor with two capacitors of twice the capacitance, in series. These capacitors are shown as 10MFD capacitors in FIG. 2. This increases the breakdown voltage while keeping the capacitance value, and therefore the tuning of the motor, unchanged. In addition, a capacitor with a ceramic composition and value in the range of 0.01 to 0.1MFD placed in parallel with the two run capacitors, also shown in FIG. 2, provides lower impedance to the high frequency switching transients created by the VFD. For example, in a single-phase motor a main winding may be in parallel with a series connected 5MFD run capacitor and auxiliary winding. The 5MFD run capacitor may be replaced with two series connected 10MFD capacitors in parallel with a 0.05MFD capacitor, as shown in FIG. 2. In some embodiments, the blower motor 56*b* has it's own phase change module similar to that of phase change module 53.

Power supply 24 of power supply section 20 is configured to supply power to control module 55. The control module 55 is the system control electronics, which provides control signals to other HVAC/R system components and power supplies. For example, the control module 55 may control power supply 22. In some embodiments, the control module 55 outputs an AC control signal, which is used with a relay to turn on or off the power supply 22. In some embodiments, control module 55 is in communication with a user control panel, which the user activates, for example, to select a desired temperature. In some embodiments, the control module 55 is in communication with a thermostat. In the HVAC/R system 200, control module 55 operates with a 24V single-phase AC power supply, provided by power supply 24. In some embodiments, power supply 24 comprises a DC/AC inverter which receives the DC signal from power bus 15, and generates the 24V AC power supply for control module 55.

In some embodiments, power supply 24 comprises a switching type inverter which generates a pseudo-sine wave by chopping the DC input voltage into pulses. The pulses are used as square waves for a step-down transformer which is followed by a wave shaping circuit, which uses a filter network to integrate and shape the pulsating secondary voltage into the pseudo-sine wave.

In this embodiment, control signals from control module 55 allow the compressor motor 52, the condenser fan 54, and the blowers 56*a* and 56*b* to be operated with the same VFD. When a load changing transition is to occur, to avoid an abrupt change in the VFD load, the control module 55 powers down all components. The control module 55 then provides signals to the system which indicate that the VFD is to efficiently power up only those components to be used. For example, while the compressor motor 52, the condenser fan 54, and the blower 56*a* are running, the thermostat indicates, or using the control panel, the user indicates that only the blower 56*a* is desired. In response, the control module 55 may generate signals to power down the compressor motor 52, the condenser fan 54, and the blower 56*a*. Subsequently, the control module 55 generates signals to efficiently start up the blower 56*a*. Accordingly, a single VFD can be used for the compressor motor 52, the condenser fan 54, and the blowers 56*a* and 56*b* without subjecting the VFD to abruptly changing loads.

Figure 3:
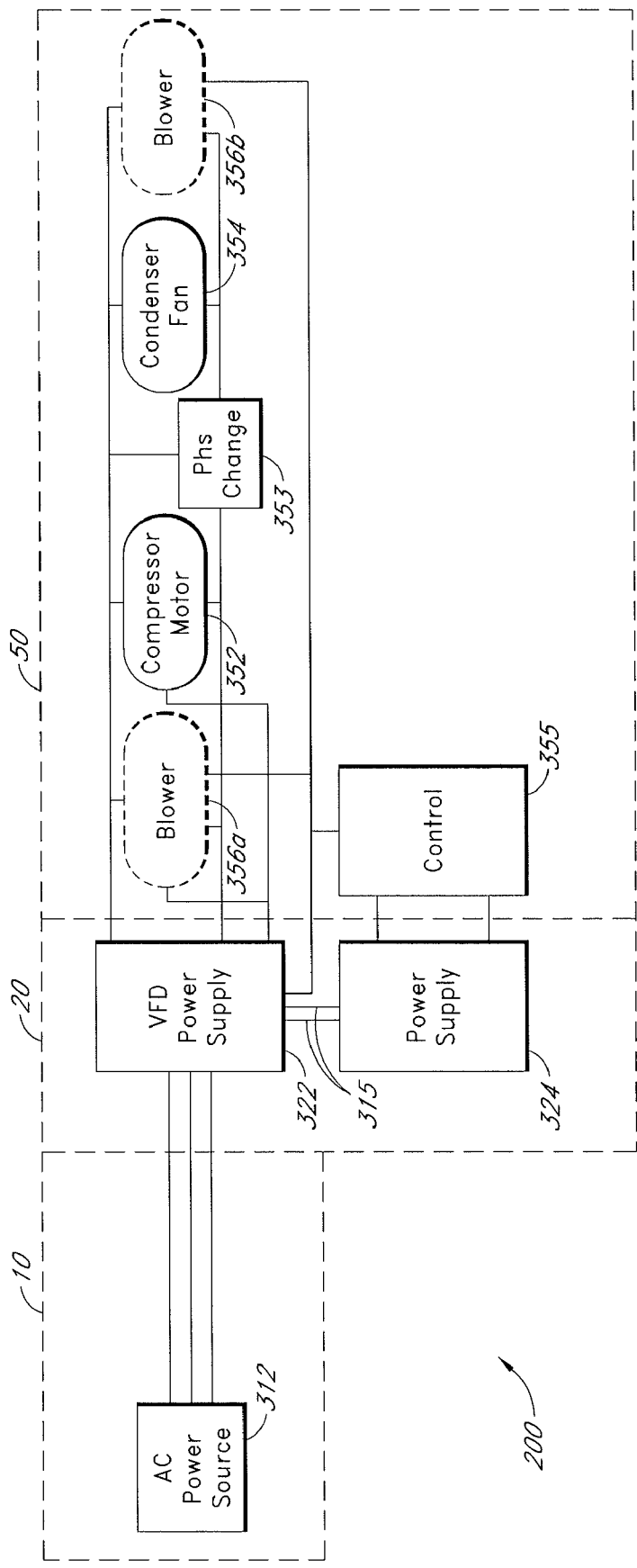
FIG. 3 is a block diagram illustrating an HVAC/R system according to one embodiment.

In some embodiments, HVAC/R system 200 is implemented as shown in HVAC/R system 300, shown in FIG. 3. In this embodiment, the rectifier 13 of FIG. 1 is included in the VFD power supply 322 of FIG. 3. An AC power source 312, which may be similar to AC power source 12 of FIG. 1, drives the VFD 322, which generates a substantially DC voltage for its own operation and for driving power bus 315. VFD 322 may have similar functionality as power supply 22 of FIG. 1. The other components shown in FIG. 3, compressor motor 352, phase change circuit 353, condenser fan 354, power supply 324, control module 355, and blowers 356*a* and 356*b*, may each have similar functionality to the corresponding components shown in FIG. 1, compressor motor 52, phase change circuit 53, condenser fan 54, power supply 24, control module 55, power supply 26, and blower 56, respectively.

In another embodiment an HVAC/R system using a variable frequency drive (VFD) power supply as described above incorporates a pulsed operation control valve to control refrigerant flow to the evaporator from the condenser. The VFD powered HVAC/R system yields varying compressor-speeds resulting in variable refrigerant flows to the condenser and to the evaporator. However, conventional expansion devices such as capillary tubes or expansion valves (AEV or TEV) cannot handle or take advantage of varying refrigerant flows and hunt or flood, thereby reducing evaporator efficiency and system performance. In order to achieve desired advantages of such variable refrigerant flows, according to this embodiment, a pulsing refrigerant control valve is used to produce a full range of evaporator superheat control at all refrigerant flows without starving or flooding the evaporator. Such refrigerant control is especially important at lower refrigerant flow rates resulting from variable compressor speeds. Conventional expansion devices are designed to operate at full flow and are inefficient at lower flows, and fluctuating flows, again, starving and/or flooding the evaporator. The pulsing valve may be a mechanical valve such as described in U.S. Pat. Nos. 5,675,982 and 6,843,064 or an electrically operated valve of the type described in U.S. Pat. No. 5,718,125, the descriptions of which are incorporated herein by reference in their entireties. Such valves operate to control refrigerant-flow to the evaporator throughout the variable refrigerant flow ranges from the compressor and condenser.

FIG. 4 schematically illustrates a vapor compression section of an HVAC/R system of FIG. 3. A pulsed operation control valve 410 is installed in liquid refrigerant line 412 of a refrigerant loop piping that directs refrigerant from condenser 420 to evaporator 430. The other components are identified by the same reference numerals of FIG. 3.

Figure 5:
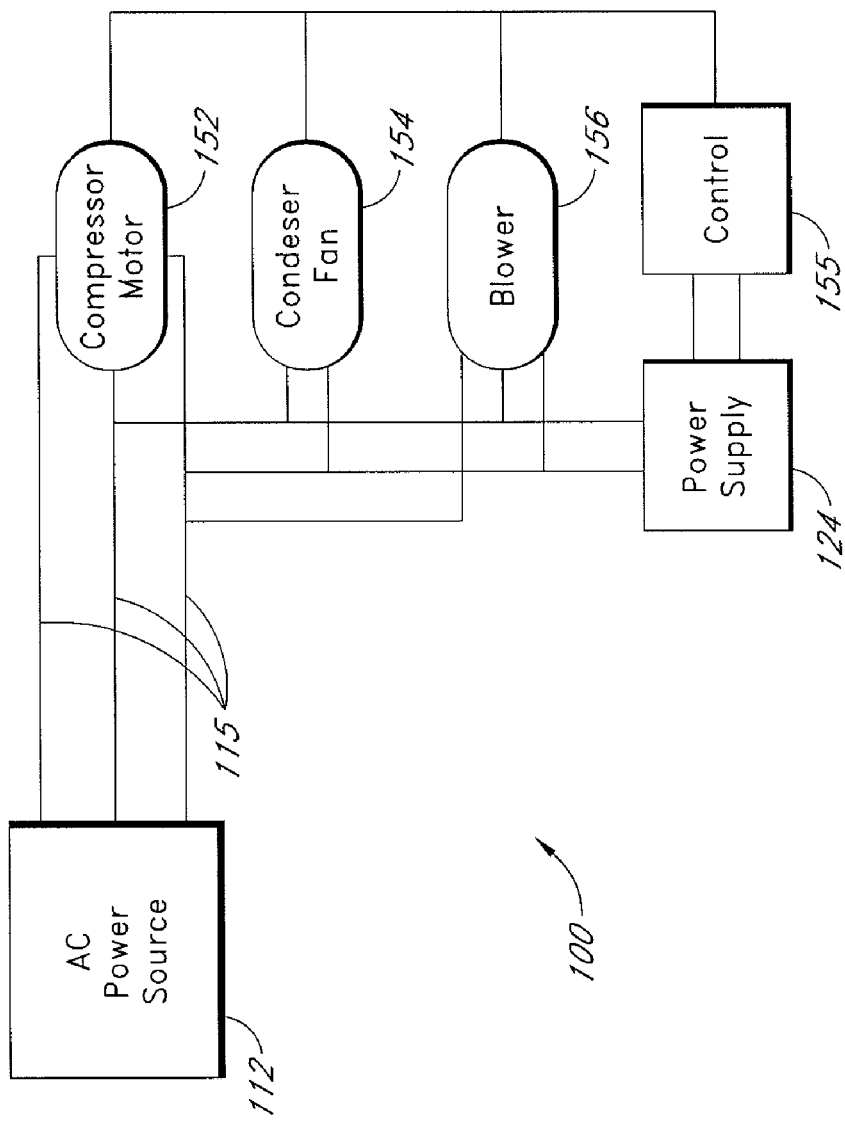
FIG. 5 is a schematic block diagram illustrating a conventional HVAC/R system.

An existing HVAC/R system may be converted to function similarly to or identically to HVAC/R system 200. For example, prior art HVAC/R system 100 shown in FIG. 5 may be converted to operate and achieve the advantages previously described. To convert HVAC/R system 100, as shown in FIG. 5, and operate and achieve the advantages previously described, AC power source 112, compressor motor 152, condenser fan 154, blower 156, power supply 124, and control module 155 are disconnected from power bus 115. Referring also to FIG. 1, AC power source 112 is connected to power a power bus, such as power bus 15 with a rectifier, such as rectifier 13. A first power supply, such as power supply 22, is connected to the power bus, to compressor motor 152, to blower 156, and to condenser fan 154. A phase change circuit, such as phase change module 53, is connected between the first power supply and the condenser fan 154. Power supply 124 is replaced with a second power supply such as power supply 24, which is connected to the power bus and to control module 155.

While the above detailed description has shown, described, and pointed out novel features as applied to various embodiments, it will be understood that various omissions, substitutions, and changes in the form and details of the devices and processes illustrated may be made by those skilled in the art without departing from the spirit of the invention. For example, inputs, outputs, and signals are given by example only. As will be recognized, the present invention may be embodied within a form that does not provide all of the features and benefits set forth herein, as some features may be used or practiced separately from others. Moreover, it is to be understood that the HVAC/R systems described herein may be configured as air conditioners, chillers, heat pumps and refrigeration systems, but are not limited thereto.

What is claimed is:

1. An electronic system, comprising:
 a first power supply configured to output three-phase AC power at variable frequencies;
 a first three-phase AC motor electrically connected to the first power supply;
 a phase change module electrically connected to the first power supply and configured to receive three-phase AC power from the first power supply and output single-phase AC power;
 a first single-phase AC motor electrically connected to the phase change module and configured to receive single-phase AC power from the phase change module; and
 a control module electrically connected to the first power supply and configured to provide control signals to the first power supply for controlling the speed of the first three-phase AC motor and the first single-phase AC motor.

2. The electronic system of claim 1, further comprising:
 a second power supply configured to output three-phase AC power at variable frequencies;
 a second three-phase AC motor electrically connected to the second power supply; and
 wherein the second power supply is electrically connected to the control module and configured to receive control signals from the control module for controlling the speed of the second three-phase AC motor.

3. The electronic system of claim 1, wherein the first three-phase AC motor is a compressor motor configured for use in a heating, ventilation, air conditioning, and refrigeration (HVAC/R) system.

4. The electronic system of claim 3, wherein the first single-phase AC motor is an evaporator fan configured for use in an HVAC/R system.

5. The electronic system of claim 3, wherein the second three-phase AC motor is a blower configured for use in a HVAC/R system.

6. The electronic system of claim 1, wherein the control module is electrically connected to a user control panel.

7. The electronic system of claim 1, wherein the control module is electrically connected to a thermostat.

8. The electronic system of claim 1, wherein the first power supply is a variable frequency drive and the second power supply is a variable frequency drive.

9. The electronic system of claim 1, wherein the system is a heating, ventilation, air conditioning, and refrigeration (HVAC/R) system comprising a condenser and an evaporator, and wherein the system further comprises a pulsed operation control valve configured to control the flow of refrigerant between the condenser and the evaporator.

* * * * *